Sept. 26, 1944.  H. A. CARRUTH  2,358,789
METHOD OF MAKING CARTONS
Filed Feb. 19, 1942  7 Sheets-Sheet 2

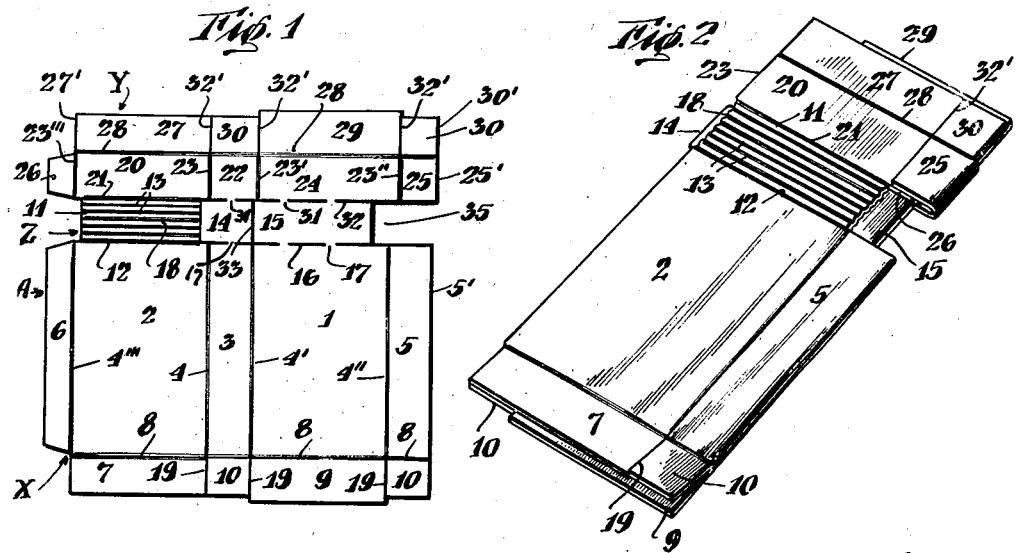
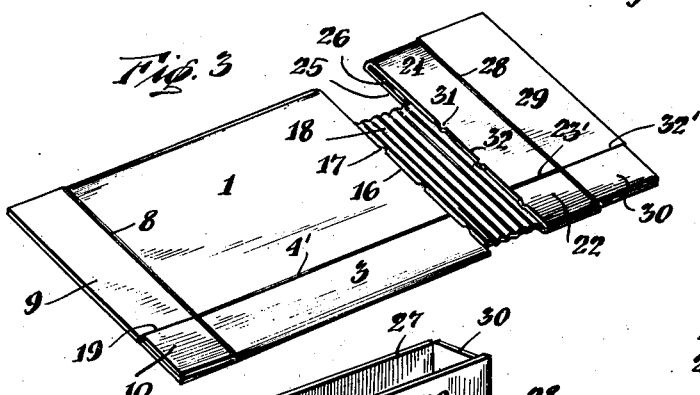
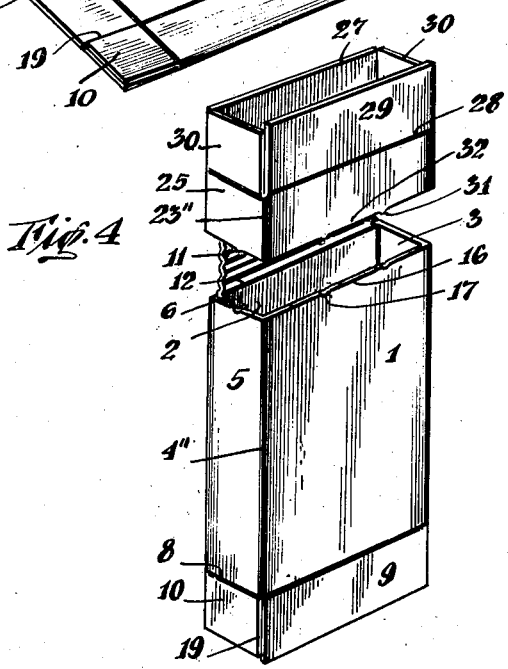
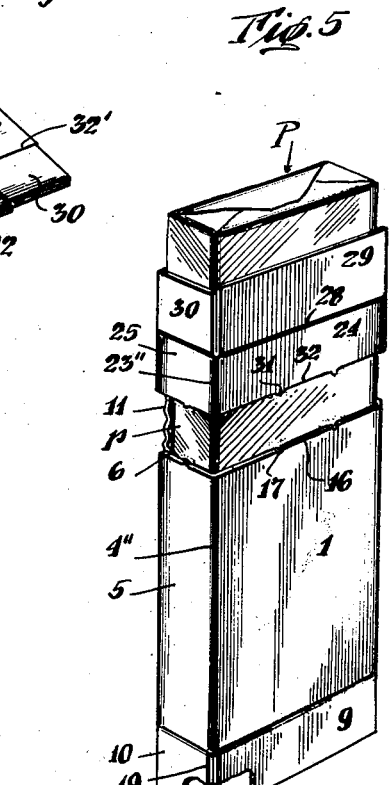

INVENTOR.
Herman A. Carruth
BY
Albert M. Austin
ATTORNEY

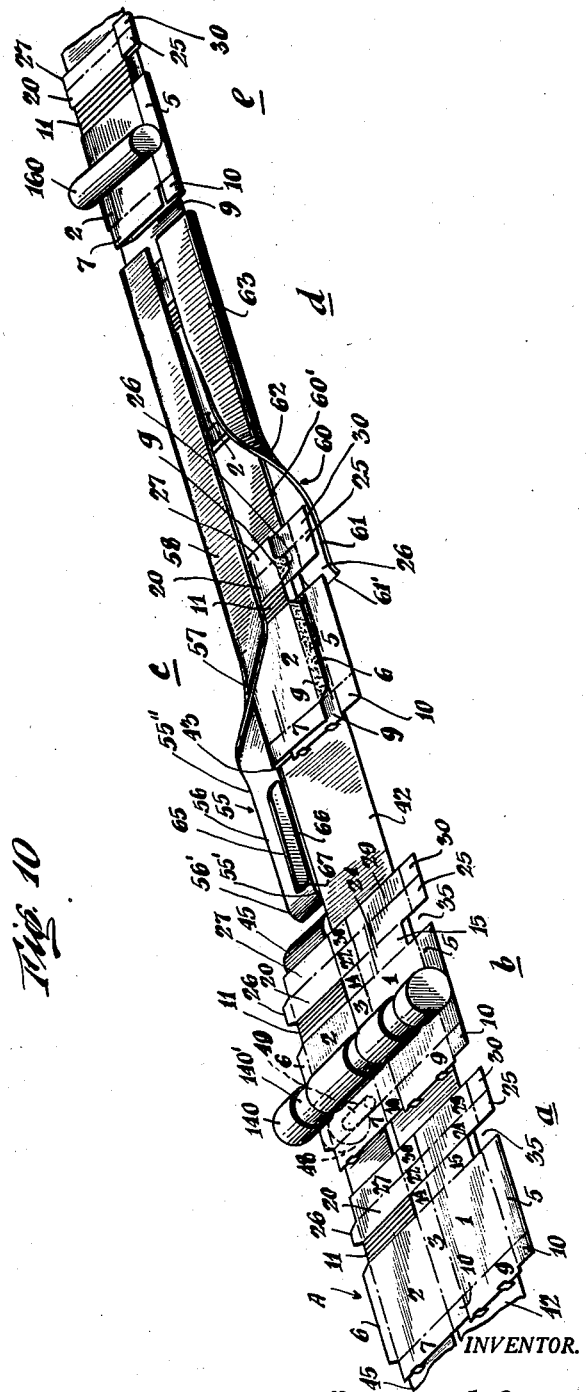

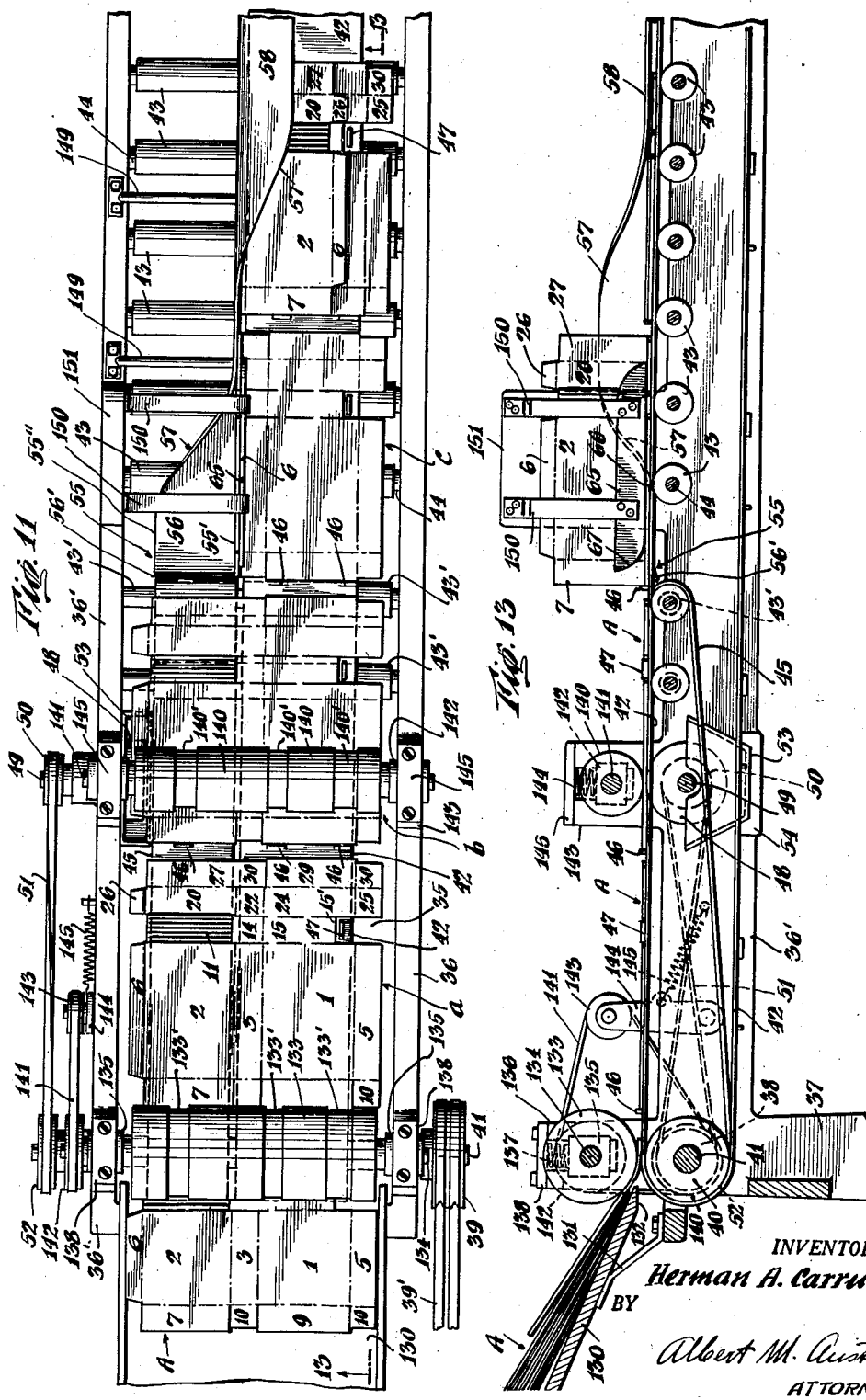

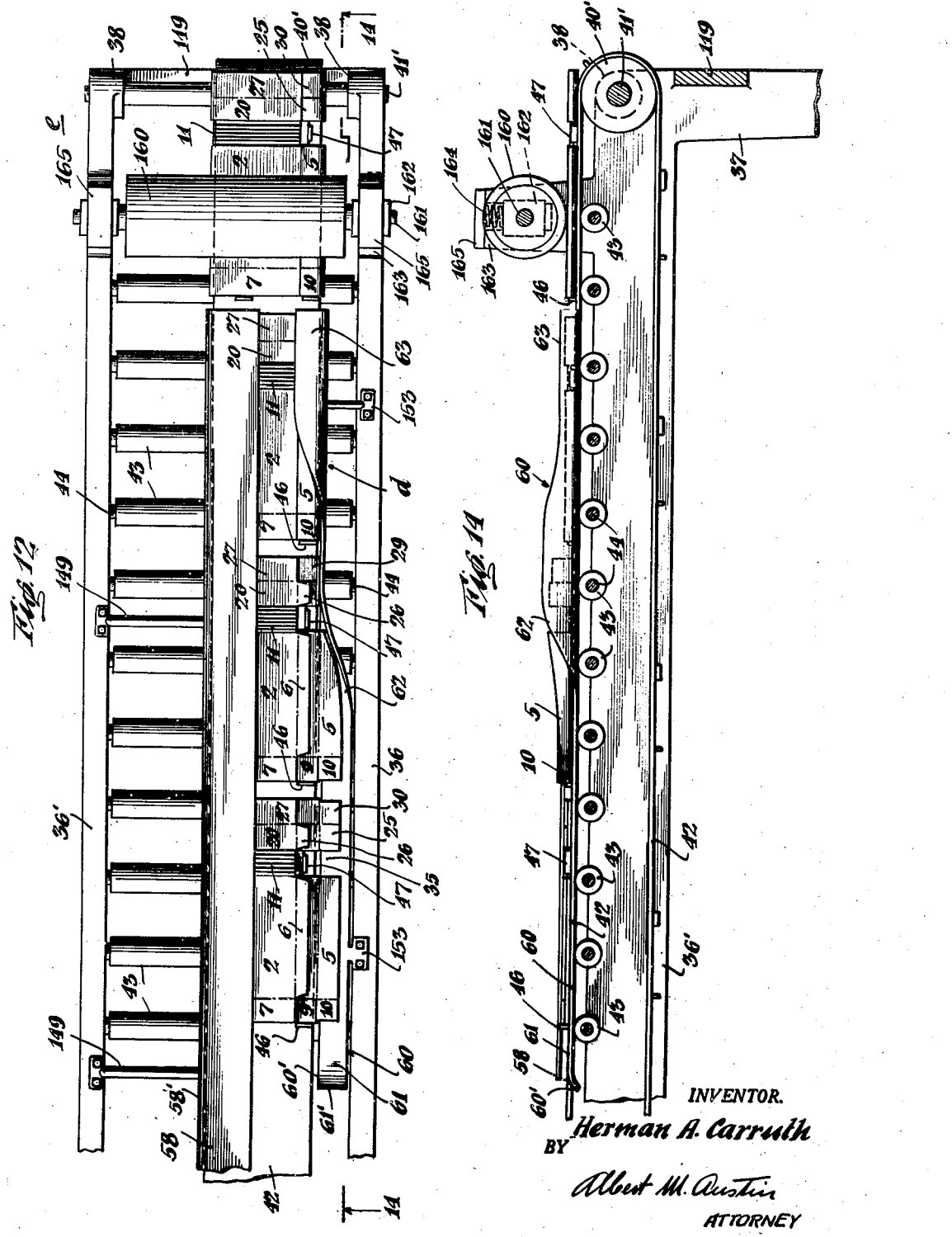

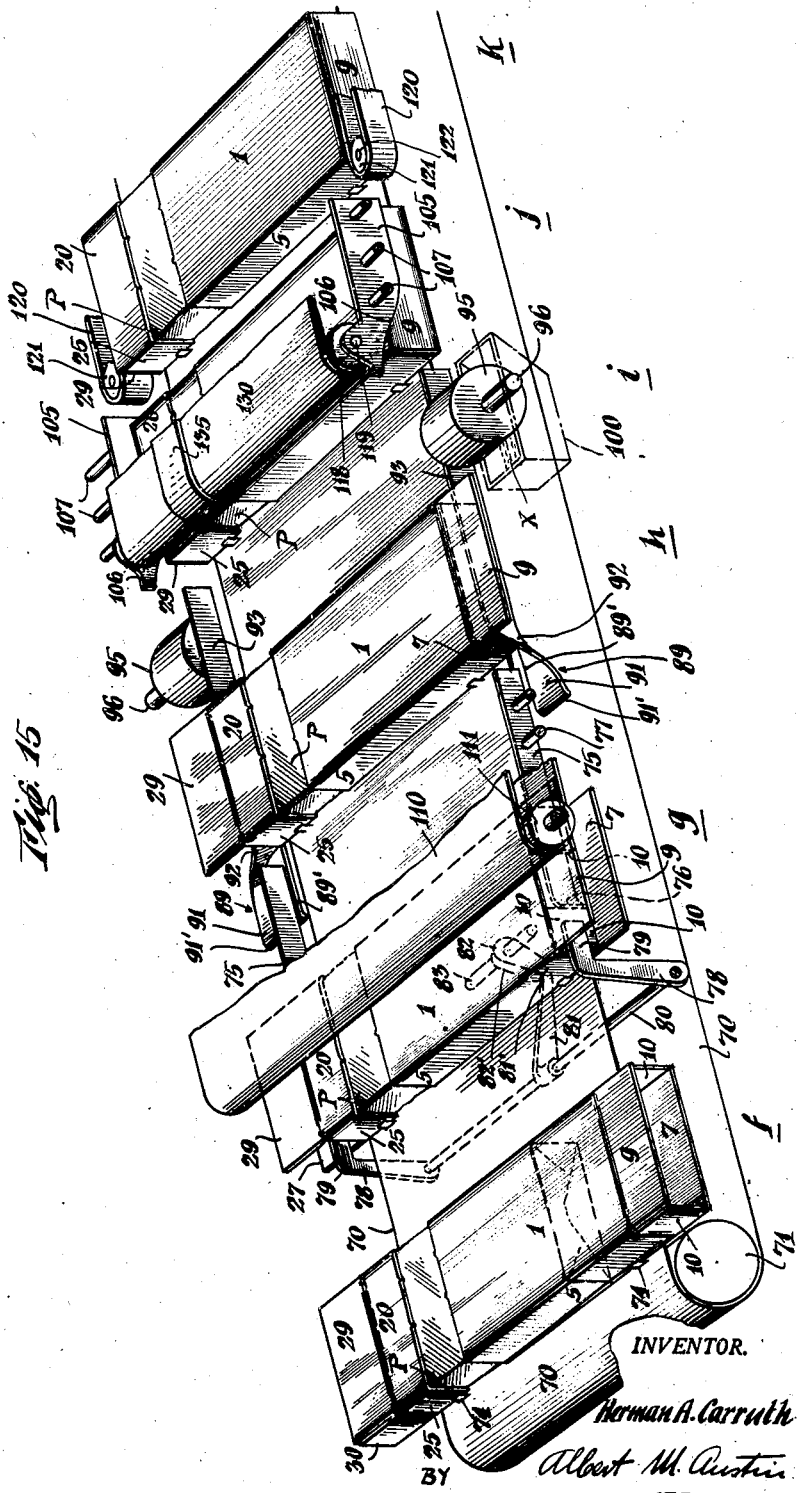

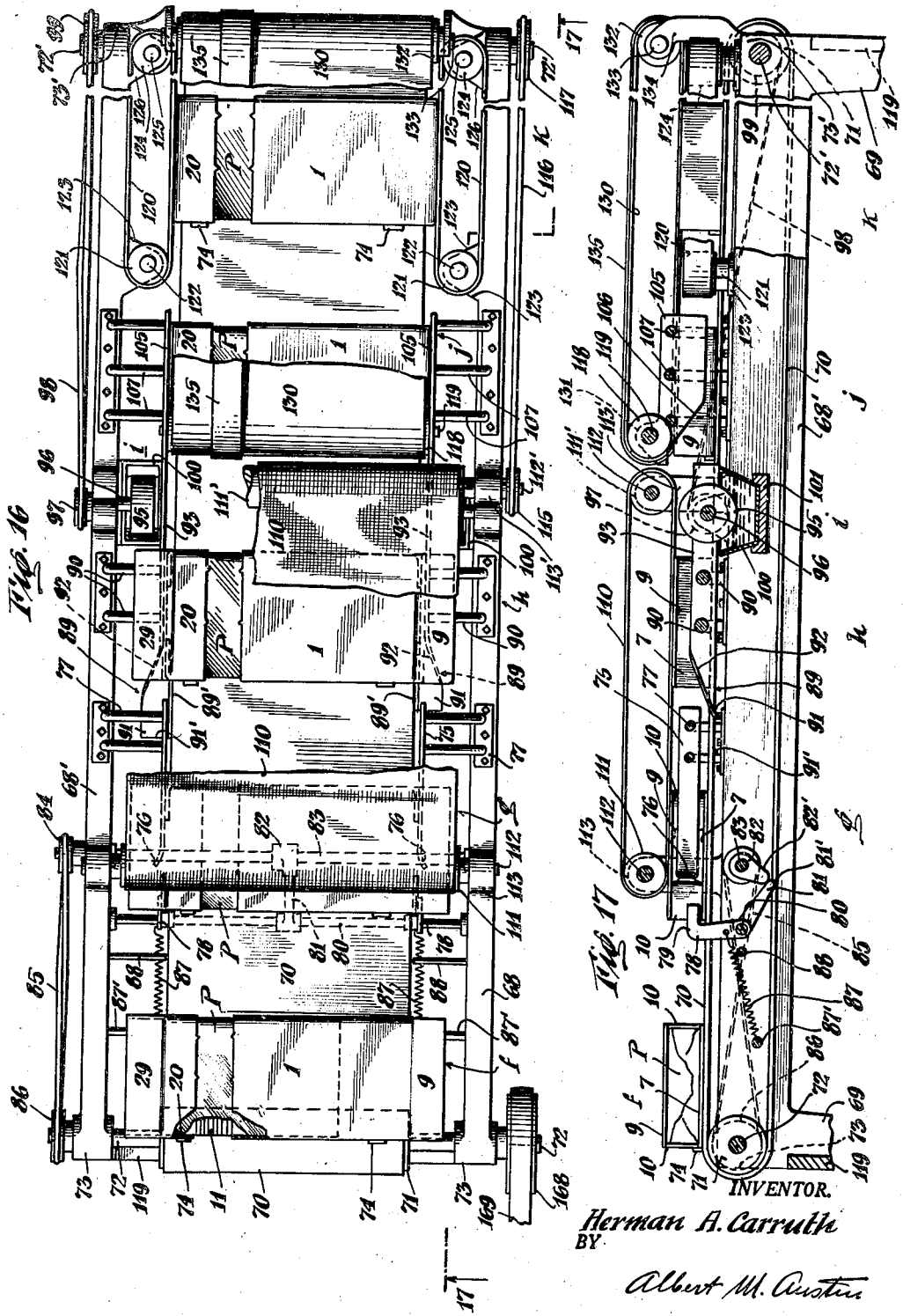

Patented Sept. 26, 1944

2,358,789

UNITED STATES PATENT OFFICE 2,358,789

METHOD OF MAKING CARTONS

Herman A. Carruth, Northford, Conn., assignor to National Folding Box Company, New Haven, Conn., a corporation of New Jersey Application February 19, 1942, Serial No. 431,459

15 Claims. (Cl. 93—49)

The invention relates to a method of making cartons, and more particularly to a method and apparatus for assembling a prepared paperboard blank into a carton having a cover part hingedly connected to the box or containing part so that the cover part may be telescoped over the open end of the box part to close the same.

No automatic method has heretofore been devised for simultaneously assembling from a one-piece paperboard blank a folding carton having a multi-walled box part to which is hingedly connected a multi-walled cover part designed so as to telescope over the open end of the box part. The difficulties encountered in undertaking to perform such automatic assembly operations simultaneously arise from the fact that the enclosing panels of the integral cover part of such a one piece paperboard carton must together possess a greater total circumferential dimension than the corresponding enclosing panels of the box part so as to permit the cover part when assembled to be telescoped over the assembled box part.

To make the enclosing panels of the cover part of the required greater total circumferential dimension requires that the vertical corner-defining score lines of the cover part be spaced farther apart than the corresponding vertical corner-defining score lines of the box part. Consequently if such a captive cover carton is to be made from a one-piece blank, certain of the cover-defining score lines in the cover part must of necessity be out of alignment with the corresponding corner-defining score lines of the box part. For this reason the only heretofore known method of assembling such one-piece captive cover cartons is, first, to partially or completely assemble the box part before assembly of the cover part is undertaken. In other words, the box part and the cover part have heretofore been formed as though they were separate and distinct box units and this only by slow, tedious and expensive hand operations. For this reason one-piece cartons having a captive cover part which telescopes over the box part have not gone into extensive use.

Captive cover cartons which have been commonly used are so constructed that the cover part has the same circumferential dimensions as the box part to which it is hinged, so that the lower edge of the cover part rests upon the top edge of the box part. Such cartons require insertion of a tubular sleeve or collar within the box part over which the enclosing walls of the cover part may telescope to retain the cover part in closed position by the frictional engagement between the enclosing walls of the cover part and the upper end of the sleeve or collar. Such cartons require considerable additional paperboard to provide the tubular sleeve or collar and the assembly and insertion cost of the tubular sleeve or collar is so great as to make this type of captive cover carton so expensive that its use has been limited to the packaging of relatively costly goods.

An object of this invention is to provide a method of assembling one-piece paperboard blanks into cartons characterized by a cover part which is hingedly connected to but adapted to telescope over the box part of the carton, which method permits assembly of the box part and the cover part simultaneously and substantially automatically at low cost.

Another object of this invention is to provide an improved method of assembling such one-piece captive cover cartons comprising relatively few and simple gluing and folding operations which can be performed automatically.

Another object of this invention is to provide improved apparatus whereby such captive cover cartons may be rapidly assembled from their one-piece blanks as the blanks travel through the apparatus.

Another object of this invention is to provide an improved machine for folding and gluing such captive cover cartons from one-piece blanks continuously and at a high production speed so as to provide integral collapsed shells which may be shipped to and stored by the merchandise manufacturer until needed.

Another object of this invention is to provide an improved machine for simultaneously sealing the bottom and cover ends of an integral paperboard shell to form such a one-piece captive cover carton.

Other objects of this invention will become apparent as the disclosure proceeds.

Although the novel features which are believed to be characteristic of this invention will be particularly pointed out in the claims appended hereto, the invention itself, as to its objects and advantages and the manner in which it may be carried out, may be better understood by referring to the following description taken in connection with the accompanying drawings forming a part thereof, in which:

Fig. 1 is a plan view of the inside face of a prepared blank from which the captive cover carton is formed;

Fig. 2 is a perspective view of the paperboard blank shown in Fig. 1 assembled into the form of a collapsed tubular shell;

Fig. 3 is a perspective view of the collapsed tubular shell with the temporary sections which connect the front panel and one side wall panel of the box part to the corresponding front panel and side wall panel of the cover part removed;

Fig. 4 is a perspective view of the tubular shell expanded and erected from its collapsed position;

Fig. 5 is a perspective view of the erected shell showing the manner in which a wrapped article of merchandise may be telescoped therein;

Fig. 10 is a diagrammatic illustration of the method and machine employed in assembling the prepared paperboard blank into the collapsed tubular shell shown in Fig. 2;

Fig. 11 is a top plan view of the head section of the shell assembling machine, and Fig. 12 is a similar top plan view of the tail section of the shell assembling machine, which views taken together show the complete machine illustrated in Fig. 10;

Fig. 13 is a vertical cross-sectional view taken longitudinally through the head section of the shell assembling machine as it appears when looking in the direction of the arrows 13—13 of Fig. 11;

Fig. 14 is a vertical cross-sectional view taken longitudinally through the tail section of the machine as it appears when looking in the direction of the arrows 14—14 of Fig. 12;

Fig. 15 is a diagrammatic illustration of the method and machine for closing and sealing the end walls of the erected tubular box shell;

Fig. 16 is a top plan view of the end wall sealing machine diagrammatically illustrated in Fig. 15; and Fig. 17 is a vertical cross-sectional view taken longitudinally of the end closing machine as it appears when looking in the direction of the arrows 17—17 of Fig. 16.

Similar reference characters refer to similar parts throughout the several views of the drawings and the specification.

Figure 6:
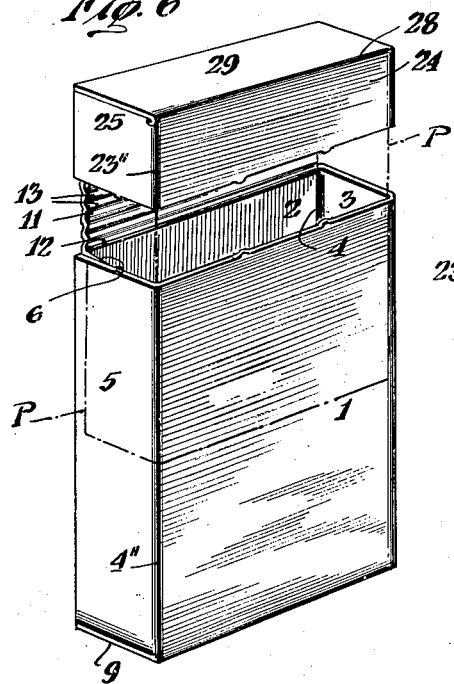
Fig. 6 is a perspective view of the assembled carton having the end walls thereof closed and sealed, with the wrapped article extending into both the cover part and the box part of the carton.

The captive cover carton is assembled from a one-piece prepared paperboard blank A which has been cut and scored as illustrated in Fig. 1. The carton blanks A may be cut and scored from large sheets or rolls of suitable paperboard material at a high production rate on a cutting and scoring machine. The paperboard sheets or rolls are preferably imprinted or lithographed on the finished side thereof before they are fed into the cutting and scoring machine and cut into carton blanks.

Referring more particularly to Fig. 1, the carton blank A comprises a box-forming part $x$ and a cover-forming part $y$ integrally joined by a connecting part $z$. The box-forming part $x$ comprises a front wall panel 1 and a rear wall panel 2 which are connected by an intermediate side wall panel 3 along corner-forming score lines 4' and 4 respectively. The other side wall panel 5 is hinged to the opposite side edge of the front wall panel 1 along the score line 4" and a glue flap 6 is hinged along the score line 4"' to the opposite side edge of the rear wall panel 2. The bottom end wall of the box is formed by bottom flaps 7 and 9 hinged respectively to the lower ends of the rear wall panel 2 and the front wall panel 1 along the continuous horizontally extending score line 8. A tab 10 is hinged to the lower end of each of the side wall panels 3 and 5 along the continuous score line 8. The tabs 10 are separated from the bottom flaps 7 and 9 by cuts 19, one cut 19 aligning with score line 4, another cut 19 aligning with score line 4' and the other cut 19 aligning with score line 4".

The cover part $y$ of the carton is formed from the upper part of the blank as shown in Fig. 1, and presents when assembled enclosing walls adapted to telescope over the enclosing walls of the box part $x$ and a top wall formed from a series of inturned flaps and tabs. The enclosing walls of the cover part comprise more particularly a rear wall panel 20 and a front wall panel 24 hinged to an intervening side wall panel 22 along the vertical score lines 23 and 23' respectively. The other side wall panel 25 is hinged to the opposite side edge of the front wall panel 24 along the score line 23" and is arranged to be secured to a securing flap 26 hinged to the opposite side edge of the rear wall panel 20 along the score line 23"'.

The top wall of the cover part is formed from a pair of top wall flaps 27 and 29 hinged to the upper edge of the rear wall panel 20 and the front wall panel 24 respectively along the continuous horizontally extending score line 28. A tab 30 is hinged to the upper end of each of the side wall panels 22 and 25 along the continuous horizontally extending score line 28, the tabs 30 being separated from the top wall flaps 29 and 27 by cuts 32'. One of the cuts 32' is in alignment with the score line 23, another cut 32' is in alignment with the score line 23', and the third cut 32' is in alignment with the score line 23".

An important feature of this invention is the construction and arrangement of the connecting section $z$ provided between the box part and the cover part of the carton-forming blank. As illustrated in Fig. 1, the top edge of the rear wall panel 2 of the box part is separated from the lower edge of the rear wall panel 20 of the cover part by a linkage section 11 which has a height slightly less than the height of the rear wall panel 20 of the cover. The linkage section 11 is joined to the upper edge of the rear wall panel 2 of the box part by a horizontally extending score line 12 and is joined to the lower edge of the rear wall panel 20 of the cover part by a similar horizontally extending score line 21, the score lines 12 and 21 being substantially parallel. To increase its flexibility the linkage section 11 is provided with a plurality of intermediate horizontally extending crease or score lines 13. The vertical edges of the linkage section 11 are free and each free edge is spaced inwardly from the adjacent corner-forming score lines 4 and 4"' respectively approximately the thickness of the paperboard from which the blank is made.

A temporary side section 14 is positioned between the upper edge of the side wall panel 3 of the box part and the lower edge of the side wall panel 22 of the cover part, and likewise a temporary section 15 is disposed between the upper edge of the front wall panel 1 of the box part and the lower edge of the front wall panel 24 of the cover part. The temporary sections 14 and 15 may be hingedly connected by a vertically extending score line 33 which forms substantially a straightline continuation of the score line 4′ which connects the side wall panel 3 with the front wall panel 1 of the box part. The opposite vertical edge of the temporary side section 14 is separated from the adjacent vertical edge of the linkage section 11 by a vertically extending cut line 18 which is slightly out of alignment with the vertically extending score line 4 disposed between the side wall panel 3 and the rear wall panel 2 of the box part, so that the width of the temporary side section 14 is greater than the width of the box side wall panel 3 by approximately the thickness of the paperboard.

The lower edges of the temporary side section 14 and the temporary front section 15 are connected to the upper edge of the side wall panel 3 and front wall panel 1 of the box part by a horizontally extending perforated line which is composed of the spaced cuts 16 separated by narrow connecting necks 17 which can be easily torn. The upper edges of the temporary side section 14 and the temporary front section 15 are connected to the lower edges of side wall panel 22 and front wall panel 24 of the cover part by a horizontally extending perforated line comprising spaced cuts 32 whose ends are separated by narrow severable neck portions 31. It will be noted from Fig. 1 that the cuts 16 are generally in alignment with the score line 12 at the upper edge of the rear wall panel 2 of the box part and that the cuts 32 are generally in alignment with the score line 21 which defines the lower edge of the rear wall panel 20 of the cover part. The temporary connecting sections 14 and 15 serve a highly important purpose during folding and gluing of the blank into collapsed shell form whereby high speed automatic assembly of the carton is made possible.

Figure 9:
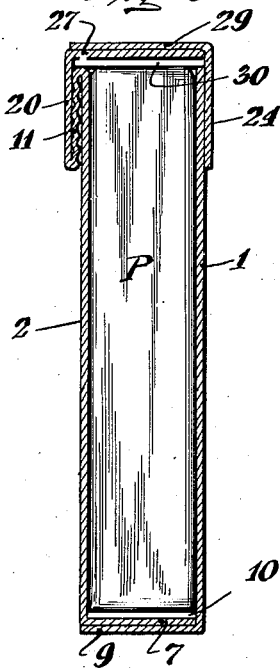
Fig. 9 is a vertical cross-sectional view through the assembled carton with the cover part telescoped over the box part as it appears when looking in the direction of the arrows 9—9 of Fig. 8.
Figure 8:
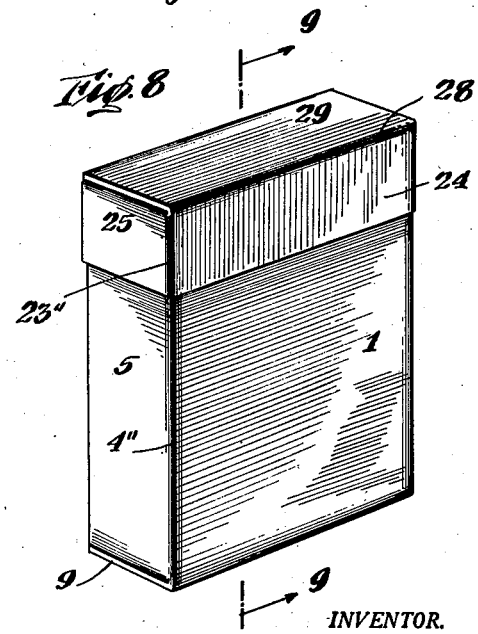
Fig. 8 is a perspective view of the fully assembled carton with the cover part in closed telescoped position over the box part.

When the carton is finally assembled and erected, the cover part is so designed as to snugly telescope over the upper end of the box part as illustrated in Figs. 8 and 9. In order that this may be accomplished, it will be appreciated that the width of the side wall panel 22 and the width of the side wall panel 25 of the cover part must be greater than the width of the corresponding side wall panels 3 and 5 of the box part over which the side wall panels 22 and 25 of the cover part telescope by approximately two thicknesses of paperboard. The width of the rear wall panel 20 and the width of the front wall panel 24 of the cover part must likewise be greater than the width of the corresponding rear wall panel 2 and front wall panel 1 of the box part by approximately two thicknesses of the paperboard. The enclosing walls of the cover part are given the necessary increased width so that when assembled into box form they will snugly telescope over the assembled enclosing walls of the box part by offsetting the corner-forming score lines of the cover part with respect to the corner-forming score lines of the box part, with one exception.

More particularly, the corner score line 23 of the cover part is substantially in accurate alignment with the corner score line 4 of the body part and is so made as to permit folding and gluing of the blank into the collapsed shell shown in Fig. 2. However, the corner score line 23′ of the cover part is offset with respect to the corner score line 4′ of the box part so as to make the width of the side wall panel 22 of the cover part greater than the width of the side wall panel 3 of the box part by approximately two thicknesses of the paperboard. The corner score line 23″ of the cover part is offset approximately four thicknesses of paperboard with respect to the corner score line 4″ of the box part, so that the width of the front wall panel 24 of the cover part which lies between the corner score lines 23′ and 23″ is approximately two thicknesses of paperboard wider than the width of the front wall panel 1 of the box part which lies between the vertical score lines 4′ and 4″. The vertical free edge 25′ of the side wall panel 25 of the cover part may overhang the free edge 5′ of the side wall panel 5 of the box part a distance equal to approximately five to six thicknesses of the paperboard, so that the side wall panel 25 when finally glued to the securing flap 26 of the cover part will be wider than the side wall panel 5 when secured to the glue flap 6 of the box part by approximately two thicknesses of paperboard. The corner score line 23‴ of the cover part is offset with respect to the corner score line 4‴ of the box part by approximately two thicknesses of the paperboard, so that the width of the rear wall panel 20 extending between vertical score lines 23 and 23‴ of the cover part is wider than the rear wall panel 2 extending between the score lines 4 and 4‴ of the box part by approximately two thicknesses of paperboard. It will be appreciated that the width of side wall panel 25 and flap 26 may be varied within rather wide limits dependent upon the amount of overlap desired when these parts are secured together, as long as the combined width of side wall panel 25 and flap 26 when secured together presents a side wall approximately two thicknesses of paperboard wider than the adjacent box side wall formed by joining side wall panel 5 to flap 6.

By thus arranging and offsetting the score lines 23′, 23″ and 23‴ defining the vertical corners of the enclosing walls of the cover part with respect to the corner score lines 4′, 4″ and 4‴ of the box part, the assembled enclosing walls of the cover part will snugly telescope over the assembled enclosing walls of the box part. The vertically extending cuts 32 which separate the inturned tabs 30 from the top wall flaps 27 and 29 are, however, in true alignment with the respective score lines 23, 23′ and 23″ of the cover part, the free edge 30′ of the tab 30 is in true alignment with the free edge 25′ of the side wall panel 25 of the cover part, and the free edge 27′ of the top wall 27 is in true alignment with the vertical score line 23‴ of the cover part.

Figure 7:
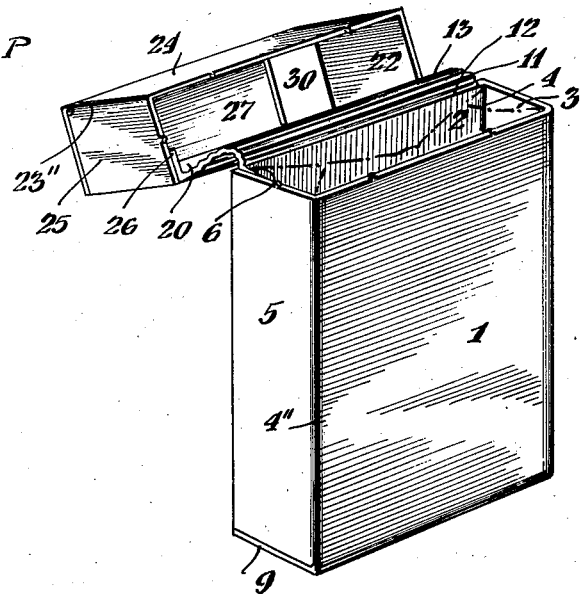
Fig. 7 is a perspective view of the fully assembled carton with the cover part swung open and the wrapped article contained entirely within the box part of the carton.

By placing the score line 23 of the cover part in alignment with the score line 4 of the box part, but offsetting the corner score lines 23′, 23″ and 23‴ of the cover part with respect to the corner score lines 4′, 4″ and 4‴ of the box part in the manner above described, and by further cutting the paperboard blank A so that the lower edge of the side wall panel 22 and the lower edge of the front wall panel 24 of the cover part are temporarily but severably connected to the upper edge of the side wall panel 3 and the front wall panel 1 of the box part, the one-piece blank may be automatically formed into a collapsed shell having its assembled box part x integrally connected to the assembled telescoping cover part y by the flexible linkage section 11 and the temporary sections 14 and 15. The temporary sections 14 and 15 are then ripped off from the collapsed shell as shown in Fig. 3, the shell expanded into tubular form as shown in Fig. 4, and the wrapped article of merchandise P is telescoped into the expanded shell as shown in Fig. 5. The merchandise article maintains both the box part and cover part of the shell fully rigidly expanded during closing and sealing of the end wall flaps as indicated in Fig. 6. The merchandise article P may then be pushed completely into the box part as indicated in Fig. 7. The enlarged cover part y will snugly telescope over the upper end of the assembled box part, as shown in Figs. 8 and 9, by reason of the fact that each of the enclosing panels of the cover part is approximately two thicknesses of paperboard wider than the width of the corresponding enclosing panels of the box part x.

Method and apparatus for forming the carton shells

Referring more particularly to Figs. 10 to 14 inclusive, the flat blanks A are positioned upon a conveyor of a blank folding and gluing machine to produce the collapsed shells illustrated in Fig. 2. The conveyor and other operating devices of the folding machine are supported upon a pair of parallel extending side frames 36 and 36' provided with legs 37. The conveyor is designed to travel continuously so as to advance the blanks into operative engagement with a series of gluing, folding and compressing mechanisms forming a part of the machine and from which the blanks will successively emerge as collapsed shells.

The conveyor may comprise a continuous main belt 42 one end of which is trained around a driving roller 40 at the head end of the machine and the discharge end of the belt is trained around a supporting roller 40' at the tail end of the machine. The driving roller 40 is fixed to a transverse shaft 41 which rotates in journals 38 mounted on the side frames 36 and 36' of the machine. The supporting roller 40' at the tail end of the machine is likewise fixed to a similar shaft 41' rotating in journals 38 fixed to the side frames 36 and 36' of the machine. The driving roller 40 may be driven by a pulley 39 fixed to the projecting end of its shaft 41 by a V-belt 39' connected to a prime mover such as a motor.

A plurality of parallel arranged idler rollers 43 are provided to support the upper run of the belt 42 and extend along substantially the entire length of the machine. Each of the rollers 43 may be mounted to idle on a shaft 44 whose ends are fixed to the side frames 36 and 36' of the machine, the shafts 44 also serving to brace and strengthen the supporting framework.

It will be noted by referring more particularly to Figs. 10, 11 and 12 that the upper run of main conveyor belt 42 does not extend the full width of the machine but has a width approximately equal only to the combined width of the front wall panel 1 and the adjacent side wall panel 3 of the blank when positioned upon the belt in the manner illustrated in Fig. 10. To support the rear wall panels 2 and 20 of the box blank, an auxiliary conveyor belt 45 is provided which has a width approximately equal to the width of the rear wall panel 2 of the blank. The auxiliary conveyor belt 45 has the head end thereof trained around the driving roller 40 and the other end thereof is trained around one of the idler rollers 43 located at the midsection of the machine. Thus the upper run of the auxiliary belt 45 will parallel and be co-planar with the adjacent upper run of the main belt 42 and will run at the same speed but will travel only a fraction of the distance that the upper run of the main belt 42 travels.

The blanks A are successively deposited at the head end of the upper run of the main conveyor belt 42 and auxiliary conveyor belt 45 with the inside-forming surface of the blank facing upward, by suitable feeding mechanism at step a. The feeding mechanism which may be used for successively depositing the blanks on conveyor belts 42 and 45 is illustrated in Figs. 11 and 13 and comprises an inclined platform 130 upon which the blanks A are stacked with the inside-forming surface thereof facing upward. The platform 130 may be rigidly supported by a bracket 131 fixed to the side frames 36 and 36' of the machine. The lower end 132 of the inclined platform 130 is positioned closely adjacent to the head end of the conveyor belts 42 and 45 and closely adjacent to a driven feed roller 133. The feed roller 133 may have a length which extends substantially the full width of the extended blank operated upon and is fixed to a transverse shaft 134 each end of which is mounted in a bearing block 135. Each bearing block 135 is arranged to ride in a guide frame 136 secured to the adjacent side frame of the machine. The feed roller 133 is designed to rotate in the direction of the arrow shown in Fig. 13 and its periphery is preferably covered with soft rubber or other composition material which serves to grip the top blank positioned on inclined platform 130 and drag it onto the conveyor belts 42 and 45. The lower periphery of the roller is maintained in predetermined frictional gripping contact with the blank being fed by means of coil springs 137 the lower end of which rests on the riding journal block 135 and the other end abuts a plate 138 adjustably secured to the guide frame 136.

The feed roller 133 may be rotated at a peripheral speed which is substantially the same as the peripheral speed of the driving roller 40 and the advancing speed of the upper run of the conveyor belts 42 and 45 by a driving connection with the driven belt supporting roller 40. This driving connection may comprise a V-pulley 140 fixed to one end of the shaft 41 which drives a V-belt 141 trained around a V-pulley 142 fixed to the feed roller shaft 134. To permit vertical riding movement of the feed roller 133, the length of the belt may be such as to permit it to pass around an idler pulley 143 which is rotatably mounted on one end of an arm 144 and whose other end is pivotally connected to the adjacent side frame of the machine. A tension spring 145 connected to the arm 144 and to the side frame 36' of the machine may be employed to hold the idler pulley against the belt with a predetermined pressure, so as to retain the transmission belt taut irrespective of the riding position of the feed roller 133.

It is important that the blanks be deposited upon the head end of the belts 42 and 45 and maintained on the belts in uniform spaced relationship. This is accomplished by providing a plurality of upwardly projecting follower lugs 46 on the belts 42 and 45 which extend transversely across the belts 42 and 45 in aligned rows and are so arranged as to push the trailing edge of the bottom flaps 7 and 9 of the blank. The lug rows are spaced apart a sufficient distance to receive the complete blank therebetween when the blanks are positioned and arranged as illustrated in Figs. 10 and 11. The lugs 46 move into engagement with the trailing end of the bottom flaps 7 and 9 when they have moved upward around the head end periphery of the belt supporting roller 40.

The over-all width of the belts 42 and 45 is such that the side wall panel 5 and its associated tab 10 of the box part and the side wall panel 25 and its associated tab 30 of the cover part will overhang the side edge of the belt 42 adjacent the side frames 36 and the glue flap 6 of the box part and the glue flap 26 of the cover part will overhang the side edge of the auxiliary belt 45 adjacent the side frame 36'. It will be appreciated that a pair of continuous conveyor chains may be substituted for the belts 42 and 45, in which event the follower lugs 46 would be carried by such paired chains.

To maintain the corner-forming creases 4' and 4" of the blank parallel with the outer side edges of the belts 42 and 45, the main belt 42 is provided with locating lugs 47 adjacent its outer side edge. Each lug 47 is adapted to enter the cut-out notch 35 of the blank and position itself adjacent the free edge 15' of the temporary front wall section 15 of the blank. Each lug 46 will enter the notch 35 of the blank without difficulty during movement of the lug 46 upwardly around the head end periphery of the belt-supporting roller 40. It will be appreciated that when this occurs the adjacent front wall panel 24 of the cover part has been already gripped and placed in position on the main belt 42. It will be further appreciated that the follower lugs 46 and the locating lugs 47 retain the blank in proper operative position upon the traveling upper runs of the conveyor belts 42 and 45 while certain gluing and folding operations are being performed thereon, as hereinafter described. The lugs 46 and 47 project above the outer surface of the conveyor belts 42 and 45 a distance which is approximately equal to the thickness of the paperboard operated upon and may be formed from the same rubberized fabric as the belts themselves are formed from. To make sure that the upper ends of the lugs 46 and 47 are not worn down by the action of the feed roller 133, the feed roller 133 may be provided with shallow grooves 133' extending around its periphery, so that the grooves will bridge the lugs passing thereunder.

At step designated b in the assembly, adhesive is applied to the outside face of the box part securing flap 6 and to the outside face of the cover part securing flap 26. As illustrated in Figs. 11 and 13, the gluing mechanism may comprise a suitable glue roller 48 positioned directly beneath the advance travel of the glue flaps 6 and 26 and is located just outside of the outer side edge of the auxiliary conveyor belt 45. The glue roller 48 is fixed to a stub shaft 49 journaled in the adjacent side frame 36' and it is rotated by a pulley 50 fixed to its shaft 49 by a crossed driving belt 51. The crossed belt 51 may be trained around a pulley 52 fixed to the projecting end of shaft 41 of the driving roller 40. The lower periphery of the glue roller 48 is immersed in adhesive contained within a glue pot 53 supported by a suitable bracket 54 fixed to the adjacent side frames 36' of the machine. It will be noted that certain of the idler rollers 43 located between the glue roller 48 and the tail end of the auxiliary belt 45 above their adjacent underportions 43' are reduced in diameter so as not to contact the adhesive applied to the undersurface of the glue flaps 26 and 6.

To further retain the advancing blanks upon the upper runs of the conveyor belts 42 and 45 and provide a backing for the glue flaps 26 and 6 so that positive application of adhesive to the undersurface of these flaps is assured, a pressure roller 140 may be provided which extends transversely of the conveyor belts 42 and 45 and is preferably positioned directly above the glue roller 48. The pressure roller 140 is fixed to a shaft 141 each end of which is journaled in a bearing block 142 vertically movable in a guide frame 143. The roller 140 exerts predetermined pressure upon the blanks moving thereunder, which pressure may be regulated by a coil spring 144 positioned within each guide frame 143. Each coil spring 144 is designed to rest upon its adjacent bearing block 142 and its upper end abuts a plate 145 adjustably fixed to the guide frame 143. The pressure roller may be positively driven by a suitable drive belt or chain trained around the driven shaft 41 of the machine or it may be freely rotated by the blank passing thereunder. The periphery of the pressure roller 140 may be formed from soft rubber or other non-slip material and may be provided with peripherally extending shallow grooves 140' which serve to bridge the lugs 46 and 47 associated with the conveyor belts 42 and 45.

At step c mechanism is provided for folding the rear wall panel 20 about score line 23 and rear wall panel 2 about score line 4 so that the rear wall panel 20 will overlie the front wall panel 24 of the cover part and rear wall panel 2 will overlie the front wall panel 1 of the box part. This folding operation can readily be performed by reason of the fact that the score lines 23 and 4 are in true straightline alignment. The folding operation will also place the top cover flap 27 in overlying position with respect to the adjacent cover tab 30 and the top flap 29, and will place the bottom flap 7 in overlying position with respect to the adjacent bottom tab 10 and the bottom flap 9. This folding operation will further place the connecting linkage section 11 in superimposed relationship over the temporary side section 14 and the temporary front section 15. This folding operation can be smoothly performed without warping or twisting the blank by reason of the fact that the corner score line 4 of the box part of the blank is in true alignment with corner score line 23 of the cover part of the blank. The adjacent cut lines 18, 19 and 32 in no way interfere with this folding operation.

The device which may be employed for effecting this folding operation at step c may comprise a stationary folding plate 55, as shown in Figs. 10, 11 and 13, positioned along the normal path of travel of the rear wall panels 20 and 2 of the blank operated upon. It will be noted that the inner edge 55' of the plate extends closely adjacent to and parallels the inner side edge of the main conveyor belt 42 but does not interfere with the travel of the belt. The folding plate 55 is stationary and is supported by suitable brackets 149 fixed to the adjacent side frame 36' of the machine.

The folding plate comprises a flat head section 56, an intermediate plow section 57 and a blank-overlying tail section 58. It will be noted that the head section 56 extends horizontally adjacent the discharge end of the auxiliary belt 45 and has a downwardly curved horizontally extending edge 56' so that the rear wall panels 20 and 2 of the blank will have unobstructed movement from the discharge end of the auxiliary belt onto the flat head section 56 of the folding plate.

A stationary folding blade 65 is positioned directly above the flat section 56 and is fixedly secured to the side frame 36' of the machine by upwardly and laterally extending bracket arms 150 attached to a vertical plate 151 whose lower end is fixed to the side frame 36', as illustrated in Figs. 11 and 13. The lower edge 66 of the blade 65 is spaced slightly above the upper surface of the flat section 56 of the folding plate so as to permit the blank to travel therebetween.

The lower edge 66 of the blade 65 is also positioned in alignment with the score lines 4 and 23 of the traveling blanks to insure positive folding of the blank about these score lines. The head end 67 of the blade 65 may be curved so as to permit free unobstructed entry of the advancing end of the blanks between the lower edge 66 of the blade 65 and the flat section 56 of the folding plate. The blanks are positively advanced thereunder and are retained to travel with the upper run of the main conveyor belt 42 by the follower lugs 46. The locating lugs 47 prevent lateral movement of the blank with respect to the upper run of the main belt 42 as the blank continues its travel along the folding plate 55.

As shown in Figs. 10 and 11, the outer half portion of the flat section 56 of the folding plate 55 merges into the intermediate smoothly curved plow section 57 which operates to swing the rear panel 20 of the cover part and the rear panel 2 of the box part upwardly and then downwardly about the score lines 23 and 4 respectively through approximately a 180° arc. This folding operation progresses from the leading cover part to the trailing box part of the blank as the blank advances on the conveyor belt 42. Lateral slippage of the traveling blanks when engaged and operated upon by the plow section 57 is prevented by the locating lugs 47 of the belt which extend into the blank cut-outs 35.

The plow sections 57, as shown in Figs. 10 and 11, gradually merges into a horizontally extending tail section 58 which is arranged to overlie the partially folded blank. The overlying flat section 58 is, however, sufficiently spaced from the folded panels 20 and 2 so as not to interfere with the advancing movement of the blank. When thus folded the glued face of the securing flaps 6 and 26 will be facing upwardly with the securing flap 6 overlying the front wall panel 1 of the box part and the securing flap 26 overlying the front wall panel 24 of the cover part. The bottom flap 7 will also overlie the adjacent bottom tab 10 and the bottom flap 9, and the top flap 27 will overlie the adjacent top tab 30 and top flap 29, and the linkage section 11 will overlie the temporary side section 14 and the temporary front section 15. It will be noted that the wavy side edge 55'' of the folding plate 55 does not extend under or over the glue flaps 26 and 6 so that no part thereof contacts the adhesive applied to these flaps.

At step d the side wall panel of the cover part 25 is folded about score line 23'' upwardly and downwardly so as to overlie the glued face of the securing flap 26, and side wall panel 5 of the box section is folded upwardly and downwardly so as to overlie the glued face of the securing flap 26. This folding operation is accomplished by a complementary stationary folding plate 60 extending along the opposite side of the conveyor, as illustrated more particularly in Figs. 10, 12 and 14. The folding plate 60 is fixedly supported by spaced brackets 153 attached to the side frame 36 of the machine.

The folding plate 60 comprises a flat head section 61 over which the side wall sections 25 and 5 of each blank advances. The head end 61' of the head section 61 may be curved downwardly so as not to obstruct the advance movement of the side wall panels 25 and 5 thereon. The flat section 61 of the stationary folding plate 60 merges into an intermediate curved plow section 62 which is positioned somewhat in advance of the plow section 57 of the opposite folding plate 55. The inner side edge 60' of the folding plate 60 is adjacent and parallel to the outer side edge of the main conveyor belt, so as not to interfere with the travel of the belt.

As the blank advances on the upper rear of the main belt 42 the plow section 62 first operates to fold side wall panel 25 of the cover part over the glue flap 26, which operation also places the adjacent cover tab 30 in position to overlie the adjacent end of the top cover flap 29. As the blank continues to advance into engagement with the plow section 62, the side wall panel 5 of the box part is folded so as to overlie the glue flap 6, carrying with it the adjacent bottom tab 10 which is placed to overlie the bottom closure flap 9. This folding operation can be smoothly and continuously performed even though the score line 23'' is not in alignment with the score line 4'' because of the fact that the side wall panels 25 and 5 are completely separated by the cut-out notch 35 in the blank. This folding operation can also be performed solely by the plow section 62 without the provision of an assisting folding blade corresponding to the folding blade 65 on the opposite side of the conveyor, for the reason that the inturned flap section 58 of the folding plate 55 retains the blank in flat position upon the conveyor belt 42 as the blank advances into engagement with the plow section 62. Slippage of the blank away from the plow section 62 is also prevented by the downturned edge 58' of the flat section 58 of folding plate 55 which is positioned opposite to the plow section 62.

The plow section 62 merges into a flat horizontally extending head section 63 which is arranged to retain the side wall panel 25 of the cover part and the side wall panel 5 of the box part in inwardly folded position but is sufficiently spaced therefrom so as not to interfere with the progressive advance of the blank thereunder.

At step e the blank advances under a pressure roller 160 positioned adjacent the free ends of the horizontal tail sections 58 and 63 of the folding plates 55 and 60. The pressure roller 160, as shown in Figs. 10, 12 and 14, serves to press the advancing side wall panels 25 and 5 into firm adhesive engagement with the glued securing flaps 26 and 6 respectively. Pressure roller 160 may be fixed to a shaft 161 whose ends are journaled in bearing blocks 162. Each bearing block 162 is supported in a guide frame 163 so as to permit vertical riding movement of the pressure roller 160. The periphery of the pressure roller 160 is preferably covered with a suitable blank-gripping material, such as rubber. The lower periphery of the roller is held in predetermined frictional engagement with the blank traveling thereunder by a pair of coil springs 164. Each coil spring 164 rests on the bearing block 162 and its upper end presses against the undersurface of a plate 165 which is adjustably secured to the guide frame 163. The frictional contact with the top surface of the blanks which are positively advanced by the follower lugs 46 is generally sufficient to rotate the pressure roller 160 at a peripheral speed which corresponds with the advancing speed of the blank, although the pressure roller may be positively driven, if desired, to assist the advance movement of the blanks.

The thus flat folded and securely glued blanks are ejected from the head end of the folding machine after they have moved clear of the pressure roller 160 and as such constitute the collapsed shells similar to the shell shown in Fig. 2.

The flat glued shells as shown in Fig. 2 may be stacked together so as to occupy a minimum of space and in this condition may be shipped to the user or merchandise manufacturer and stored until needed. It will be noted that the temporary side section 14 and temporary front section 15 positioned between the box part and the cover part of the collapsed shells may be still in place when shipped to the merchandise manufacturer, as shown in Fig. 2, or they may be removed from the collapsed shell before shipment, as shown in Fig. 3. These temporary sections are removed by grasping the free end of the temporary front section 15 by means of a suitable instrument and by a ripping action the front section 15 and the side section 14 may be torn loose from the collapsed shell, as illustrated in Fig. 6. It will be noted that the temporary front section 15 and side section 14 are joined to the adjacent upper edges of the front wall panel 1 and the side wall panel 3 of the box part x by the narrow uncut necks 17 of the paperboard, which necks will readily break when a light pull is exerted on the temporary sections 15 and 14. Likewise the temporary sections 15 and 14 are secured to the front wall panel 24 and side wall panel 22 of the cover part y by the spaced narrow neck portions 31 which will also break when a light pull on the temporary sections 15 and 14 is exerted. It will also be noted that the vertical edge of the temporary side section 14 is free of the adjacent vertical edge of linkage section 11 by reason of the cut line 18, so that once the narrow neck portions 17 and 31 are torn, the strip comprising the temporary front section 15 and temporary side section 14 may be easily removed and discarded. It will be appreciated that in forming the blank shown in Fig. 1, the score line 33 may be eliminated so that the removable sections 14 and 15 form a continuous rigid piece, in which event the neck portions 17 and 31 which connect removable section 14 to panels 3 and 22 are eliminated so that section 14 is completely separated from the panels 3 and 22. In such event the temporary front section 15 along with the hinge section 12 would adequately serve to hold the cover part to the box part during assembly into collapsed shell form.

When merchandise is to be packed therein the collapsed shell may be expanded into the tubular form shown in Fig. 4 and at this stage the wrapped merchandise P as in Fig. 5 may be freely inserted into the expanded tubular shell through either end thereof. The wrapped merchandise P is preferably in the form of a wrapped plug of the required shape and size so as to snugly fit within the box part and cover part of the expanded shell. This insertion operation can be performed automatically or by hand.

*Method and apparatus for closing and sealing the carton end walls*

The end walls of the carton shell may be readily sealed when the plug of merchandise P has been telescoped therein. The merchandise plug P positioned within the expanded shell supports the expanded box and cover parts of the carton shell in rigid erect tubular form during the end sealing operation. The end walls of the expanded carton shell are preferably sealed by a sealing machine installed at the plant of the user or merchandise manufacturer so that the glued shells may be shipped to and stored by the user while in the collapsed form illustrated in Fig. 2 and Fig. 3, thereby effecting substantial economies in shipping and storage space.

The end wall sealing machine illustrated in Figs. 15, 16 and 17 comprises a pair of parallel extending side frames 68 and 68' supported on suitable legs 69. The side frames may be rigidly connected by spacer bars 119. The loaded carton shells are supported on a continuous belt conveyor 70, the head end of which is trained around a driving roller 71 and the tail end of which is trained around a supporting roller 71'. Roller 71 is fixed to a suitable shaft 72 journaled in bearings 73 carried by the side fames 68 and 68' at the head end of the machine and the supporting roller 71' is likewise fixed to a shaft 72' journaled in bearings 73' supported by the side frames 68 and 68' at the discharge end of the machine. A drive pulley 168 fixed to the projecting end of shaft 72 carries a drive belt 169 which is driven by a prime mover to rotate the belt roller 71 and advance the upper run of the belt.

The conveyor belt 70 is provided with follower lugs 74 which are arranged in rows transversely of the belt, each row of lugs 74 being arranged to engage the trailing side wall panels 5 and 25 of the expanded shell. The lug rows are so spaced that the loaded carton shells placed on the upper run of the belt are spaced apart a sufficient distance to permit performance of certain mechanical operations of the machine, as hereinafter brought out.

As shown more particularly in Figs. 15 and 16, the loaded shells are positioned upon the upper run of the conveyor belt 70 so that the top and bottom end flaps thereof overhang and project beyond the adjacent side edges of the traveling belt, thereby permitting simultaneous sealing and closing of both the top and bottom end walls of the carton.

At step f, as illustrated in Figs. 15, 16 and 17, the loaded carton shells are consecutively positioned at the head end of the upper run of the belt 70. This feeding operation may be carried out by any desired automatic feeding mechanism, which, for example, may include a downwardly inclined feeding platform, such as the platform 130 illustrated in Figs. 11 and 13, which operates to deposit the shells so that the trailing side panels 5 and 25 of each expanded shell will be engaged by the follower lugs 74. The follower lugs 74 may be formed integral with and from the same material as the rubber-impregnated fabric belt 70, or they may comprise metal elements suitably secured thereto. Once the loaded shells have been positioned upon the upper run of the belt 70, the follower lugs 74 will engage the trailing side panels of the shell and will positively uniformly advance the shells in proper spaced relationship into operative engagement with various mechanisms which simultaneously close and seal the end walls of the shell.

At step *g*, the sealing machine operates to turn the bottom tabs 10 and the top tabs 30 inwardly so that they are substantially in parallelism. The device for performing this operation comprises a pair of stationary fingers 75 which are formed from relatively flat metal strips extending generally parallel and adjacent to the side edges of the belt 70. The fingers 75 may be secured to suitable brackets 77 fixed to the adjacent side frame of the machine. One of the fingers 75 is positioned so as to operate upon the bottom tabs 10 and the other finger 75 is positioned so as to operate upon the top tabs 30 of the shell. The head end 76 of each finger is curved outwardly so that the tabs 10 and 30 at the advancing end of the tubular shell will ride into contact with the fingers 75 smoothly and without friction and will be folded backwardly and inwardly between the laterally extending end wall forming flaps of the shell.

Another device is provided for folding the tabs 10 and 30 at the trailing end of the loaded shell forwardly and inwardly so that the free ends thereof may be engaged by the curved head ends 76 of the fingers 75. This device may comprise a pair of spaced rocker arms 78 each having a forwardly projecting anvil portion 79. The rocker arms 78 are fixed to the ends of a rocker shaft 80 which is suitably journaled in the side frames 68 and 68' of the machine. The rocker shaft 80 is positioned preferably below the upper run of the conveyor belt 70 and is rocked by a cam lever 81 fixed to the midsection of the shaft. A cam member 82 is positioned beneath the upper run of the belt 70 and is fixed to a shaft 83 whose ends are also journaled in the side frames 68 and 68' of the machine. The cam shaft 83 is continuously driven by a pulley 84 fixed to the projecting end thereof. A crossed belt 85 is trained around the pulley 84 and a pulley 86 fixed to the projecting end of the driven shaft 72.

The outer end 81' of the cam lever 81 is maintained in riding contact with the peripheral cam surface 82' of the cam 82 by a tension spring 87. One end of each tension spring 87 is attached to the adjacent rocker arm 78 and the other end is attached to a suitable pin 87' fixed to the adjacent side frame of the machine. The tension springs 87 operate to normally retain the anvil portion 79 thereof in sleeping position below the path of travel of the loaded shells resting upon the upper run of the conveyor belt 70. The rocker arms are, however, limited in their downward swinging movement by a stop pin 88 which projects from the adjacent side frame of the machine.

The cam periphery 82' of the cam 82 is so shaped that the anvil portions 79 of the rocking arms 80 are in sleeping position below the path of travel of the expanded shells until such time as the trailing side panels 5 and 25 have reached a position substantially directly above the rocker shaft 80. When this occurs the cam 82 has rotated to a position where the cam riding end 81' of cam lever 81 will be swung downwardly with a quick movement and the rocking arms 78 will be quickly swung upwardly against the action of tension springs 87 so that the anvil portions 79 of the rocker arms 78 will strike the adjacent trailing tabs 10 and 30 of the shell and fold them forwardly and inwardly before the shell operated upon has been substantially advanced.

When this has been accomplished the cam end 81' of cam lever 81 moves upwardly by reason of the reducing diameter of the cam track 82' of rotating cam 82 so as to permit the tension springs 87 to pull the rocking arms 78 back into sleeping position below the path of advance of the traveling shell. Before the anvil portions 79 have been completely retracted from the trailing tabs 10 and 30, however, the leading edges of the tabs have moved into contact with the flared ends 76 of the fingers 75 and the trailing tabs 10 and 30 are thereafter retained in forward infolded position by the adjacent fingers 75. Once the trailing fingers 75 have engaged both the leading and trailing tabs 10 and 30, these tabs are held thereby in infolded parallelism. The loaded shells engaged by the follower lugs 74 are retained by these lugs sufficiently spaced apart to permit free and unobstructed upward and downward swinging movement of the rocking arms 78.

As the shells continue their advance the bottom flap 7 and top flap 27 move into contact with an adjacent folding plate 89. The inner side edges 89' of the folding plates 89 are adjacent and extend generally parallel to the side edges of the upper run of the traveling conveyor belt 70. One of the folding plates 89 operates to fold the bottom flap 7 upwardly so as to overlie the inturned tabs 10 of the shell and the other complementary folding plate 89 at the other side of the machine operates to fold the top flap 27 upwardly so as to overlie the inturned top tabs 30. Each of the folding plates 89 is stationary and is secured to the adjacent side frames of the machine by suitable brackets 90.

Each folding plate 89 comprises a relatively short horizontal flat head section 91 which merges into an intermediate smoothly curved plow section 92 which in turn merges into a relatively flat upstanding tail section 93. The head end 91' of the relatively flat horizontally extending head section 91 is bent downwardly so as to permit unobstructed advance movement of the adjacent lowermost end wall sealing flap of the blank onto the head section.

Before the infolded tabs 10 and 30 have been released by the fingers 75, the bottom sealing flap 7 and top sealing flap 27 of the shell have advanced into contact with the smoothly curved plow sections 92 of the adjacent folding plates 89. It will be appreciated that one of the plow sections 92 operates to fold the bottom flap 7 upwardly as the shell advances while the other plow section 92 of the opposite folding plate 89 operates to fold the top flange 27 upwardly. Thus the bottom flap 7 and the top flap 27 are folded upwardly substantially simultaneously as the expanded shell is retained in position by the follower lugs 74 and before the inturned tabs 10 and 30 are released by the tab-engaging and retaining fingers 75. As the shells continue their advance, the upwardly extending tail sections 93 of the folding plates 89 retain the bottom flap 7 and top flap 27 in the vertically extending upfolded position in which they have been placed by the plow sections 92.

While the bottom flap 7 and the top flap 27 are still retained in vertically extending upfolded position by the vertical holding sections 93 of the folding plates 89, adhesive is applied to the undersurface of the laterally projecting bottom folding flap 9 and top folding flap 29, which operation takes place at step *i*. The device for applying adhesive to the undersurface of the flaps 9 and 29 may comprise a pair of spaced glue rollers 95 fixed to a shaft 96 journaled in the side frames 68 and 68' of the machine. The glue rollers 95 are positioned just outside of the adjacent side edges of the upper run of the traveling conveyor belt 70, one glue roller being positioned so that its upper periphery makes adhesive-applying contact with the undersurface of the bottom flap 7 and the upper periphery of the other glue roller 95 makes adhesive-applying contact with the undersurface of the top flap 27. The shaft 96 on which the glue rollers 95 are secured is positively driven by means of a pulley 97 fixed to the projecting end of the shaft 96. A crossed belt 98 extending around the pulley 97 is also trained around a pulley 99 fixed to the projecting end of the shaft 72'. It will be appreciated that the shaft 72' is continuously driven by the conveyor belt 70 which it supports and that the conveyor belt 70 is driven from shaft 72 at the head end of the machine by the drive belt 169.

The lower periphery of each glue roller 95 is immersed in a suitable liquid adhesive contained within a glue pot 100 supported by a bracket 101 fixed to the adjacent side frame of the machine.

At step j, devices are provided for simultaneously folding the bottom flap 9 downwardly into adhesive contact with the outside surface of the upfolded bottom flap 7 and for folding the top flap 29 downwardly into adhesive contact with the outside surface of the upfolded top flap 27. These folding devices may comprise a pair of spaced folding blades 105 one of which operates upon the bottom flap 9 and the other of which operates upon the top flap 29. The folding blades 105 operate to fold the flaps 9 and 29 downwardly into adhesive contact with the outside surfaces of the upfolded adjacent flaps 7 and 27 before the vertically extending holding sections 93 of the folding plates 89 have released the upturned flaps 7 and 27. The lower head edge 106 of each folding blade 105 is preferably tapered to a blunt knife point so that the lower edge of the blade will execute a smooth downwardly folding action on the adjacent flap operated upon. The blades 105 may be fixed to suitable brackets 107 secured to the side frame of the machine.

Since the shell is continuously advancing and quickly moves beyond the influence of the blades 105, additional means at step K are provided for retaining the flaps 9 and 29 in contact with the outside surface of the upfolded adjacent flaps 7 and 27 until the adhesive therebetween has had an opportunity to sufficiently dry to permanently hold the parts together. The means for accomplishing this purpose may comprise a pressure belt 120 at each end of the shell, as shown in Figs. 15, 16 and 17, which is so mounted that the inner run of one belt retains the downturned bottom flap 9 in adhesive contact with the upturned bottom flap 7 and the inner run of the other belt retains the downturned top flap 29 in adhesive contact with the upturned top flap 27. The forward end of each belt may be trained around a roller 121 which rotates on a vertically extending stub shaft 122 fixed to a bracket 123 carried by the adjacent side frame of the machine. The trailing end of each belt is likewise trained around a roller 124 supported upon vertically extending stub shaft 125 carried by bracket 126 fixed to the adjacent side frame of the machine. Each of the belts may be power driven by a power driving connection between the roller 124 and the driven shaft 72' of the machine so that the inner run of the belt is driven at the same speed as the speed of advance of the carton shells. The belts 120 are of sufficient length so that the flaps 9 and 29 become fixedly secured to the respective adjacent flaps 7 and 27 before the carton is discharged from the machine.

To insure positive retention of the advancing shells positioned upon the upper run of the traveling belt 70 so that they will not jump out of position when operated upon, the machine may be provided with an overhead pressure belt 110 which extends from approximately the curved head ends 76 of the fingers 75 to the folding blades 105. The head end of the holding belt 110 may be supported by a supporting roller 111 fixed to a shaft 112 whose ends are rotatably supported in journaled blocks 113 supported by the adjacent side frames 68 and 68' of the machine. The discharge or tail end of the holding belt 110 may likewise be trained around a supporting roller 111' fixed to a shaft 112' journaled in bearing blocks 113' supported by the side frames 68 and 68' of the machine. The lower run of the holding belt 110 serves to hold the traveling expanded shells firmly seated on the upper run of the conveyor belt 70 and it may be sufficiently wide to overhang the bottom flap 9 and top flap 29 so as to back up these flaps while they are operated upon by the glue rollers 95.

The holding belt 110 may be positively driven at the same speed as the conveyor belt 70 from the roller supporting shaft 111' by means of a pulley 115 fixed to the projecting end of shaft 111'. A crossed belt 116 is trained around the pulley 115 and also around a pulley 117 fixed to the projecting end of the shaft 72'. The lower run of the holding belt 110 travels with and serves to further positively retain the expanded shells in firm advancing position upon the upper run of the conveyor belt 70 during the advancing period when the tabs 10 and 30 are infolded into parallelism, during the advancing period when the bottom and top flaps 7 and 27 are folded upwardly, and during the advancing period when adhesive is applied to the undersurface of the bottom and top flaps 9 and 29.

When the shells emerge from the discharge end of the holding belt 110 they pass under a second holding belt 130. The second holding belt 130 has a width substantially equal to the conveyor belt 70. The head end of the belt 130 is trained around a roller 118 fixed to supporting shaft 119 which is rotatably supported in bearings provided in brackets 131 which may be integrally secured to the adjacent blades 105 or to the adjacent side frame of the machine. The other end of the belt 130 is supported upon a belt roller 132 fixed to shaft 133 rotatably supported in brackets 134 fixed to the framework at the tail end of the machine. Roller 132 may be power driven by a suitable driving connection between shaft 133 and the driven shaft 72'.

The holding belt 130 carries a continuous secondary belt portion 135 which extends continuously around the length of the belt 130. The secondary belt portion 135 may be permanently secured to the belt 130 or it may be made removable therefrom. The secondary belt portion 135 has a width which corresponds generally to the distance between the lower edge of the front wall portion 20 of the cover part and the top edge of the front wall portion 1 of the box part of the carton when the box and cover parts are fully extended, and has a depth or thickness corresponding to the thickness of the paperboard so that its lower run will contact the package P within the carton. The secondary holding belt 130 serves to retain the cartons in fixed position upon the upper run of the conveyor belt 70 as they advance into operative engagement between the folding blades 105 and the end pressure belts 120. The secondary belt portion 135 provides a strut between the lower edge of the front wall 20 of the cover part and the upper edge of the front wall 1 of the box part, so that the cover part is retained in fixed spaced relationship with respect to the box part during the period that pressure is exerted on the bottom flap 9 and top flap 29 by the inner run of the pressure belts 120. Thus the cover and box parts are held rigidly extended so that positive pressure may be exerted on the end walls by the inner run of the pressure belts 120 during advance of the cartons therebetween.

Method of closing the carton

When the loaded shells, with their bottom and top ends closed and sealed, are discharged from the machine illustrated in Figs. 10, 11 and 13, the merchandise plug P is partly housed within the cover part and partly housed within the box part thereof.

The merchandise plug P may then be pushed into the box part to be completely contained therein. The cover part y may then be telescoped into closed position over the upper end of the box part, as illustrated in Figs. 8 and 9. As heretofore brought out, the width of each of the cover enclosing panels, comprising front panel 24, rear panel 20 and side panels 22 and 25, is approximately two thicknesses of paperboard material greater than the circumferential width of the corresponding enclosing panels of the box part, comprising front panel 1, rear panel 2, and side panels 3 and 5. Thus the cover part is properly dimensioned so as to telescope snugly over the upper end of the box part.

As the cover part is telescoped over the upper end of the box part, the linkage section 11 will roll downwardly between the outside face of the box rear wall panel 2 and the inside face of the cover rear wall panel 20 to the point where the paperboard material of the linkage section between the hinge lines 12 and 21 will extend in a substantially straight line. When the cover part is in closed position, the linkage section 11 will thus be snugly sandwiched between the box rear wall panel 2 and the cover rear wall panel 20 so that the cover part is retained on the upper end of the box part with substantial holding friction.

When access to the merchandise contents is desired, an upward pull is exerted on the cover part causing the linkage section 11 to roll in the opposite direction until the cover part has been released from the top edge of the box part so that the cover part can be swung completely off from the mouth end of the box part as shown in Fig. 7 to provide unobstructed access to the merchandise in the box part. Since the cover part is hingedly connected to the box part by the linkage section 11, the cover part need not be held or supported either during insertion of the contents into or removal of the contents from the box part. Thus opened, the wrapper enclosing the merchandise can then be torn open to give free access to the contents in the box part x, or the merchandise plug may be removed from the carton, as desired.

By cutting and scoring the blanks as illustrated in Fig. 1 by means of a standard cutting and scoring die, the carton assembly operations can be performed automatically at a high speed of production and at very low cost. By reason of the fact that the corner score line 4 and the corner score line 23 are in straight-line alignment, the rear wall panel 2 of the box part and the rear wall panel 20 of the cover part may be smoothly folded over the complementary front wall panels 1 and 24 during the continuous travel of the blank through the folding machine illustrated in Figs. 10 to 14 inclusive. The glue flaps 6 and 26 are so positioned that a stripe of adhesive may be applied thereto by a strip gluer during the continuous high-speed travel of the blanks. While the side wall panel 5 is hinged to front panel 1 by the score line 4″ which is out of alignment with the score line 23″ which hinges the side wall panel 23 to the front wall panel 24, the side wall panels 25 and 5 may be consecutively folded into adhesive contact with the corresponding glue strips 26 and 6 during the continuous travel of the blank because of the fact that the side wall panels 25 and 5 are wholly independent of each other and separated by the deeply notched cut-out 35. The offset position of the score lines 23′, 23″ and 23‴ with respect to the score lines 4′, 4″ and 4‴ respectively in no way interferes with the automatic assembly of the blanks into collapsed shell form. The temporary connecting sections 14 and 15 secure the cover part of the blank to the box part with sufficient rigidity that the blank can be operated upon by the folding machine as if it were a solid rectangular blank.

As shown in Fig. 3, when the temporary sections 14 and 15 have been removed from the collapsed shell, and the collapsed shell then erected into expanded form as shown in Fig. 4, the corner score lines 23, 23′ and 23″ and 23‴ of the cover part will automatically align themselves over the outer surfaces of the corresponding corner score lines 4, 4′, 4″ and 4‴ of the box part, so that the merchandise may be telescoped into the expanded shell so as to extend partly into the expanded cover part and partly into the expanded box part. The front wall panel 24 and the rear wall panel 20 of the cover part will have a width approximately two thicknesses of paperboard greater than the width of the corresponding front wall panel 1 and rear wall panel 2 of the box part. Likewise the side wall panels 22 and 25 of the cover part will have a width approximately two thicknesses of paperboard greater than the width of the corresponding side wall panels 3 and 5 of the box part. The scores formed in the blank by the cutting and scoring die have a width which substantially equals the thickness of the paperboard so that the corner folds which are formed will adjust themselves to telescoping requirements.

The top and bottom end panels of the loaded tubular shell may be closed and sealed as the shell continuously advances through the end sealing machine illustrated in Figs. 15, 16 and 17. This operation can be automatically and simultaneously performed by reason of the fact that the merchandise plug retains both the cover part and the box part rigidly expanded and rectangular in cross-section. Since the cover forming part and the box forming part of the shell are connected by the linkage hinge section 11 and are held rigidly erect by the merchandise plug P, the end sealing machine can function as though it were operating upon a rigid one-piece tubular body.

In addition to the advantages gained by reason of the high production speeds and economies in manufacture effected by the use of my method and apparatus, the assembled carton is strong and sturdy in construction, pleasing in appearance, and accurately formed as to size.

While certain novel features of the invention have been disclosed and are pointed out in the annexed claims, it will be understood that various omissions, substitutions and changes may be made by those skilled in the art without departing from the spirit of the invention.

What is claimed is:

1. The method of making cartons each formed from a single blank of paperboard material and having a box part and a cover part hingedly connected to and designed to telescope over the box part, which method includes the steps of applying substantially straight and parallel extending scores to the box part and to the cover part of the blank to define separate side wall forming enclosing panels for the box part and the cover part with the score lines in the cover part of the blank spaced approximately two thicknesses of the paperboard farther apart than the score lines in the box part of the blank and with one of the score lines in the box part of the blank substantially in alignment with one of the score lines in the cover part of the blank.

2. The method of making cartons each formed from a single blank of paperboard material and having a box part and a cover part hingedly connected to and designed to telescope over the box part, which method includes applying substantially straight and parallel extending score lines to the box part and to the cover part of the blank to define separate side wall forming enclosing panels for the box part and the cover part with the score lines in the cover part of the blank spaced approximately two thicknesses of the paperboard farther apart than the score lines in the box part of the blank and with one of the score lines in the box part of the blank substantially in alignment with one of the score lines in the cover part of the blank, advancing said blank along a predetermined path, and applying adhesive to a side edge of the blank during said advance.

3. The method of making cartons each formed from a single blank of paperboard material and having a box part and a cover part hingedly connected to and designed to telescope over the box part, which method includes, applying substantially straight and parallel extending score lines to the box part and to the cover part of the blank to define separate side wall forming enclosing panels for the box part and the cover part with the score lines in the cover part spaced approximately two thicknesses of the paperboard farther apart than the score lines in the box part of the blank and with one of the score lines in the box part of the blank substantially in alignment with one of the score lines in the cover part of the blank, advancing said blank along a predetermined path, applying adhesive to a side edge of the blank during said advance, and folding said blank along said aligned score lines during said advance.

4. The method of making cartons having a box part and a cover part connected by a connecting part and formed from a single blank of paperboard material, said method including, forming parallel extending corner-forming scores in the box part and in the cover part of the blank to define the enclosing panels of the box and cover parts so that the score lines in the cover part are spaced approximately two thicknesses of paperboard farther apart than the score lines in the box part, forming transversely extending scores along a section of said connecting part to provide an integral hinging connection between one of the panels of the box part and one of the panels of the cover part, and perforating the boundary of the remaining connecting part to provide a removable section for temporarily connecting certain of the panels of the box part and cover part to facilitate folding and gluing of the blank into collapsed shell form.

5. The method of making cartons having a box part and a cover part connected by a connecting part and formed from a single blank of paperboard material which includes, forming parallel extending corner-forming scores in the box part and in the cover part of the blank to define the enclosing panels of the box and cover parts so that the score lines in the cover part are spaced approximately two thicknesses of paperboard farther apart than the score lines in the box part with one of the score lines in the box part substantially in alignment with one of the score lines in the cover part, forming transversely extending scores along a section of said connecting part to provide an integral hinging connection between one of the panels of the box part and one of the panels of the cover part, and perforating the boundary of the remaining connecting part to provide a removable section for temporarily connecting certain of the panels of the box part and cover part to facilitate assembly of the blank into shell form.

6. The method of making cartons having a box part and a cover part connected by a connecting part and formed from a single blank of paperboard material, said method including, forming parallel extending corner-forming scores in the box part and in the cover part of the blank to define the enclosing panels of the box and cover parts so that the score lines in the cover part are spaced approximately two thicknesses of paperboard farther apart than the score lines in the box part with one of the score lines in the box part substantially in alignment with one of the score lines in the cover part, forming transversely extending scores along a section of said connecting part to provide an integral hinging connection between one of the panels of the box part and one of the panels of the cover part, perforating the boundary of the remaining connecting part to provide a removable section for temporarily connecting certain of the panels of the box part and cover part to facilitate assembly of the blank into carton form, folding and securing together the enclosing panels of the box and cover parts to provide a tubular shell, removing said removable section, and closing and sealing the top and bottom walls of said shell.

7. The method of making a paperboard carton having a box part and a cover part joined by a connecting part formed from a single blank of paperboard material which includes, forming parallel extending corner-forming scores in the box part and in the cover part of the blank to define front, rear and side forming panels in the box part and cover part so that the corner-forming scores in the cover part are approximately two thicknesses of paperboard farther apart than the corner-forming scores in the box part, forming transversely extending scores along a section of said connecting part to provide a hinging connection between the rear panels of the box part and cover part, perforating the boundary of the remaining connecting part to provide a removable section for temporarily connecting one side panel and the front panel of the box part to the adjacent side panel and front panel of the cover part, and forming a notch in the side edge of the blank to completely separate the upper end of the other side wall panel of the box part from the lower end of the adjacent side wall panel of the cover part.

8. The method of making a paperboard carton having a box part and a cover part connected by a connecting part formed from a single blank of paperboard material which includes, forming parallel extending corner-forming scores in the box part and in the cover part of the blank to define front, rear and side forming panels in the box part and cover part so that the score lines in the cover part are approximately two thicknesses of paperboard farther apart than the corner scores in the box part with one of the score lines in the box part substantially in alignment with one of the score lines in the cover part, forming transversely extending scores along a section of said connecting part to provide a hinging connection between the rear panels of the box part and cover part, perforating the boundary of the remaining connecting parts to provide a removable section for temporarily connecting one side panel and the front panel of the box part to the adjacent side panel and front panel of the cover part, and forming a notch in the side edge of the blank to completely separate the upper end of the other side wall panel of the box part from the lower end of the adjacent side wall panel of the cover part.

9. The method of making a paperboard carton having a box part and a cover part connected by a connecting part formed from a single blank of paperboard material which includes, forming parallel extending corner-forming scores in the box part and in the cover part of the blank to define front, rear and side forming panels in the box part and cover part so that the score lines in the cover part are approximately two thicknesses of paperboard farther apart than the corner scores in the box part, forming transversely extending scores along a section of said connecting part to provide a hinging connection between the rear panels of the box part and cover part, perforating the boundary of the remaining connecting parts to provide a removable section for temporarily connecting one side panel and the front panel of the box part to the adjacent side panel and front panel of the cover part, forming a notch in the side edge of the blank to completely separate the upper end of the other side wall panel of the box part from the lower end of the adjacent side wall panel of the cover part, folding and securing together the enclosing panels of the box and cover parts to provide a tubular shell, removing said removable section, and closing and sealing the top and bottom walls of said shell.

10. The method of making a carton formed from a single board of paperboard material and having a box part and a cover part joined by a connecting part which includes, applying substantially straight and parallel extending corner-forming scores in the box part and in the cover part of the blank to define separate front, rear and side forming panels and securing flaps for the box part and cover part with the corner scores in the cover part of the blank approximately two thicknesses of paperboard farther apart than the corner scores in the box part of the blank with one of the corner scores in the box part of the blank substantially in alignment with one of the scores in the cover part of the blank, and notching out the opposite side edges of the connecting part of the blank to separate the adjacent side panels of the box and cover parts of the blank and the adjacent securing flaps of the box and cover parts of the blank.

11. The method of making a carton formed from a single blank of paperboard material and having a box part and a cover part joined by a connecting part which includes, applying substantially straight and parallel extending corner-forming scores in the box part and in the cover part of the blank to define front, rear and side forming panels and securing flaps for the box part and cover part, with the scores in the cover part of the blank approximately two thicknesses of paperboard farther apart than the corner scores in the box part of the blank and with one of the corner scores in the box part of the blank substantially in alignment with one of the scores in the cover part of the blank, notching out the opposite side edges of the connecting part of the blank to separate the adjacent side panels of the box and cover parts of the blank and the adjacent securing flaps of the box and cover parts of the blank, folding the blank along the aligned scores in the box part and cover part thereof, and folding the separated side panels of the box and cover parts of the blank into cementing contact with the corresponding separated securing flaps of the box and cover parts of the blank.

12. The method of making a carton formed from a single blank of paperboard material and having a box part and a cover part joined by a connecting part which includes, applying substantially straight and parallel extending corner-forming scores in the box part and in the cover part of the blank to define front, rear and side forming panels and securing flaps for the box part and cover part with the corner scores in the cover part of the blank approximately two thickness of paperboard farther apart than the corner scores in the box part of the blank and with one of the corner scores in the box part of the blank substantially in alignment with one of the scores in the cover part of the blank, notching out the opposite side edges of the connecting part of the blank to separate the adjacent side panels of the box and cover parts of the blank and the adjacent securing flaps of the box and cover parts of the blank, folding the blank along the aligned scores in the box part and cover part thereof, folding the separated side panels of the box and cover parts of the blank into cementing contact with the corresponding separated securing flaps of the box and cover parts of the blank to provide a collapsed tubular shell, removing a portion of said connecting part, expanding and loading said shell, and closing and sealing the ends of said loaded shell.

13. The method of making a carton formed from a single blank of paperboard material and having a box part and a cover part joined by a connecting part which includes, applying substantially straight and parallel extending score lines in the box part and in the cover part of the blank to define separate side wall forming enclosing panels for the box part and the cover part with the score lines in the cover part of the blank spaced approximately two thicknesses of paperboard farther apart than the score lines in the box part of the blank and with one of the score lines in the box part of the blank arranged substantially in alignment with one of the score lines in the cover part of the blank, folding said blank along the aligned score lines in the box and cover parts thereof, securing together the unconnected side edges of the superimposed panels of the box part and cover part of the part to provide a tubular shell, and closing and sealing the ends of the tubular shell.

14. The method of making a carton formed from a single blank of paperboard material and having a box part and a cover part joined by a connecting part which includes applying substantially straight and parallel extending score lines in the box part and in the cover part of the blank to define separate side wall forming enclosing panels for the box part and cover part with the score lines in the cover part of the blank spaced approximately two thicknesses of paperboard farther apart than the score lines in the box part of the blank and with one of the score lines in the box part of the blank arranged substantially in alignment with one of the score lines in the cover part of the blank, folding said blank along the aligned score lines in the box and cover parts thereof, securing together the unconnected side edges of the superimposed panels of the box part and cover part of the blank to provide a tubular shell, removing a section of said connecting part whereby the cover part is hingedly connected to the box part by the remaining connecting part which provides a hinging section, and closing and sealing the ends of the tubular shell.

15. The method of making a paperboard carton having a box part and a cover part connected by a connecting part formed from a single blank of paperboard material which includes, forming parallel extending corner-forming scores in the box part and in the cover part of the blank to define front, rear and side forming panels in the box part and cover part so that the score lines in the cover part are approximately two thicknesses of paperboard farther apart than the corner scores in the box part with one of the score lines in the box part substantially in alignment with one of the score lines in the cover part, forming transversely extending scores along a section of said connecting part to provide a hinging connection between the rear panels of the box part and cover part, perforating the boundary of the remaining connecting parts to provide a removable section for temporarily connecting one side panel and the front panel of the box part to the adjacent side panel and front panel of the cover part, folding said blank along the aligned score lines in the box and cover parts, securing together the unconnected side edges of the superimposed panels of the box part and cover parts to provide a tubular shell, removing the temporary section of said connecting part whereby the cover part is hingedly connected to the box part by the remaining hinging section of said connecting part, and closing and sealing the ends of the tubular shell.

HERMAN A. CARRUTH.